(12) United States Patent
Yu

(10) Patent No.: US 12,276,326 B1
(45) Date of Patent: Apr. 15, 2025

(54) WAVE GENERATOR WITH SEALING PLATE AND INSTALLATION METHOD THEREOF

(71) Applicant: Tung Pei Industrial Co., Ltd., Taipei (TW)

(72) Inventor: Wei-Kuei Yu, Taoyuan (TW)

(73) Assignee: TUNG PEI INDUSTRIAL CO., LTD., Taipei (TW)

( * ) Notice: Subject to any disclaimer, the term of this patent is extended or adjusted under 35 U.S.C. 154(b) by 0 days.

(21) Appl. No.: 18/505,069

(22) Filed: Nov. 8, 2023

(51) Int. Cl.
 *F16H 49/00* (2006.01)
(52) U.S. Cl.
 CPC .................................. *F16H 49/001* (2013.01)
(58) Field of Classification Search
 CPC ..................................................... F16H 49/001
 USPC ............................................................. 74/640
 See application file for complete search history.

(56) References Cited

U.S. PATENT DOCUMENTS

| | | | | |
|---|---|---|---|---|
| 8,585,296 | B2* | 11/2013 | Yamaguchi | F16C 33/7853 384/477 |
| 8,628,249 | B2* | 1/2014 | Winkelmann | F16C 33/726 277/552 |
| 10,006,534 | B2* | 6/2018 | Murayama | F16H 49/001 |
| 10,823,278 | B2* | 11/2020 | Tezuka | F16H 1/32 |
| 11,940,009 | B2* | 3/2024 | Zhang | F16C 33/80 |

FOREIGN PATENT DOCUMENTS

| | | |
|---|---|---|
| CN | 105864282 A | 8/2016 |
| CN | 114060518 A | 2/2022 |
| CN | 115614390 A | 1/2023 |
| TW | 201518624 A | 5/2015 |

OTHER PUBLICATIONS

Search Report for TW112125724, Issued on Nov. 17, 2023, Total of 1 page.
English Abstract for CN115614390A, Total of 1 page.
English Abstract for CN105864282A, Total of 1 page.
English Abstract for TW201518624A, Total of 1 page.
English Abstract for CN114060518A, Total of 1 page.

* cited by examiner

*Primary Examiner* — Ha Dinh Ho
(74) *Attorney, Agent, or Firm* — Apex Juris, pllc; Tracy M Heims

(57) ABSTRACT

A wave generator with a sealing plate includes an elliptical hub having a rotating axis. An inner ring of a bearing fits around a peripheral surface of the elliptical hub. The inner ring and an outer ring of the bearing change from a circular shape to an elliptical shape along with the peripheral surface. The inner ring and the elliptical hub are rotatable around the rotating axis. A sealing plate which is elliptical fits around the inner ring. An outer edge of the sealing plate abuts against the outer ring. The sealing plate is driven by the elliptical hub and the inner ring to rotate around the rotating axis and shelters a side of the rolling bodies. In the present invention, the sealing plate is installed in the bearing to shelter the rolling bodies after the bearing deforms.

7 Claims, 9 Drawing Sheets

WAVE GENERATOR WITH SEALING PLATE AND INSTALLATION METHOD THEREOF

BACKGROUND OF THE INVENTION

Technical Field

The present invention relates generally to a wave generator used in a harmonic drive, and more particularly to a wave generator with a sealing plate and an installation method thereof.

Description of Related Art

A conventional wave generator is installed in a harmonic drive and includes an elliptical hub and a bearing fitting around the elliptical hub. When the elliptical hub rotates, an outer ring of the bearing would change in shape along with a rotation of the elliptical hub.

Although a sealing ring which is annular is disposed between an inner ring and an outer ring of some bearings, the sealing ring is often connected to the outer ring and is already disposed in the bearings before the assembly of the bearings is completed. Therefore, the bearings with the sealing ring cannot be used as the bearing of the wave generator in which the inner ring and the outer ring of the bearing of the wave generator are deformable. As a result, among harmonic drives on the market, an outside of the bearing of the wave generator lacks a way of preventing the contamination, such as dirt, dust, or other foreign objects. When the contamination enters the bearing, hindering the smoothness of the rotation of the bearing, accelerating the oxidization of inner grease, and deteriorating the lubricating function are resulted, which affect the precision of the operation and the useful life of the harmonic drive.

BRIEF SUMMARY OF THE INVENTION

In view of the above, the primary objective of the present invention is to provide a wave generator, wherein a sealing plate, which is rotatable along with an elliptical hub and shelters a side of a bearing, is disposed in a flexible bearing, which is deformed by fitting around the elliptical hub, so that the outside contamination could be prevented from entering the bearing of the wave generator, which affects the operation of the wave generator.

The present invention provides a wave generator with a sealing plate including an elliptical hub, a bearing, and a sealing plate. The elliptical hub has a rotating axis, a first major axis, and a first minor axis, wherein a length of the first major axis is unequal to a length of the first minor axis. The rotating axis passes through a center of the elliptical hub. The bearing is a flexible bearing and includes an inner ring, an outer ring, and a plurality of rolling bodies, wherein the inner ring fits around a peripheral surface of the elliptical hub, so that a shape of the inner ring changes from a circular shape to an elliptical shape along with the peripheral surface of the elliptical hub. The outer ring is coupled with a periphery of the inner ring through the rolling bodies. The inner ring and the elliptical hub are rotatable around the rotating axis relative to the outer ring. The sealing plate has a second major axis and a second minor axis, wherein a length of the second major axis is unequal to a length of the second minor axis. A direction of the second major axis and a direction of the second minor axis of the sealing plate are respectively the same as a direction of the first major axis and a direction of the first minor axis of the elliptical hub. The sealing plate fits around the inner ring of the bearing by an inner edge of the sealing plate and abuts against the outer ring by an outer edge of the sealing plate. The sealing plate is driven by the elliptical hub and the inner ring to rotate around the rotating axis and shelters a side of the rolling bodies.

The present invention further provides an installation method of the wave generator with the sealing plate, including in sequence: the inner ring, the outer ring, and the rolling bodies constitute the bearing; the elliptical hub is fitted in the inner ring of the bearing, so that the inner ring fits around the peripheral surface of the elliptical hub; the inner ring and the outer ring change from a circular shape to an elliptical shape along with a shape of the peripheral surface of the elliptical hub; the sealing plate is installed between the inner ring and the outer ring of the bearing, so that the inner edge of the sealing plate fits around the inner ring of the bearing and the outer edge of the sealing plate abuts against the outer ring; the sealing plate is driven by the elliptical hub and the inner ring to rotate around the rotating axis and shelters a side of the plurality of rolling bodies.

With the aforementioned design, after the bearing fits around the elliptical hub to be deformed, the sealing plate adapted to shelter the rolling bodies is disposed on the inner ring which is deformed, thereby the sealing plate could rotate along with the inner ring and the elliptical hub, and the outer edge keeps abutting against the outer ring. In this way, when the present invention which is already installed in a harmonic drive operates, the outside contamination, which affects the operation of the wave generator, is prevented from entering the bearing of the wave generator, so that the wave generator could keep operating smoothly.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

A wave generator with a sealing plate 100 according to an embodiment of the present invention is illustrated in FIG. 1 to FIG. 7, is adapted to be installed in a conventional harmonic drive to drive the harmonic drive to operate, and includes an elliptical hub 10, a bearing 20, and a sealing plate 30.

Figure 1:
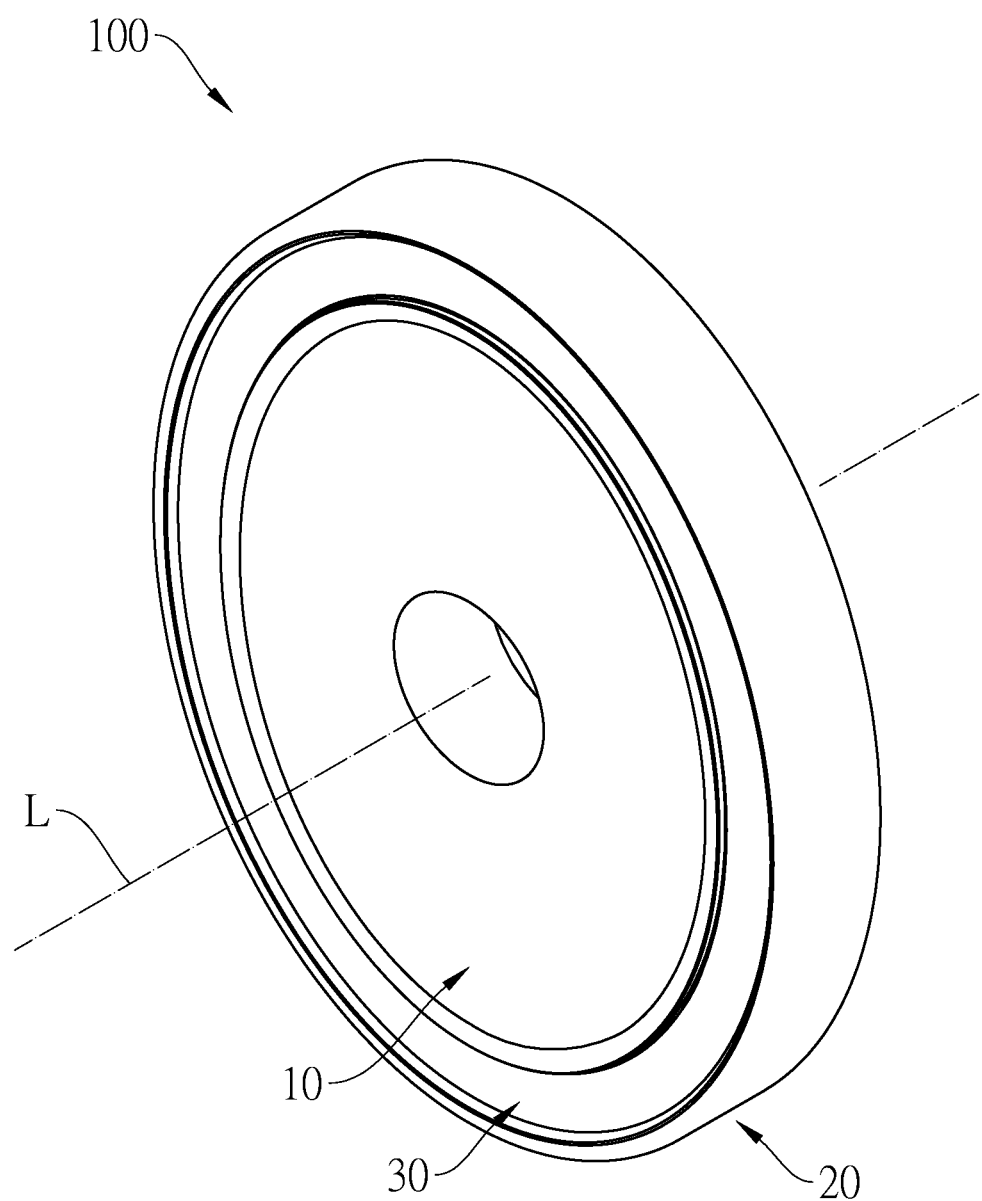
FIG. 1 is a perspective view of the wave generator with the sealing plate according to an embodiment of the present invention.
Figure 2:
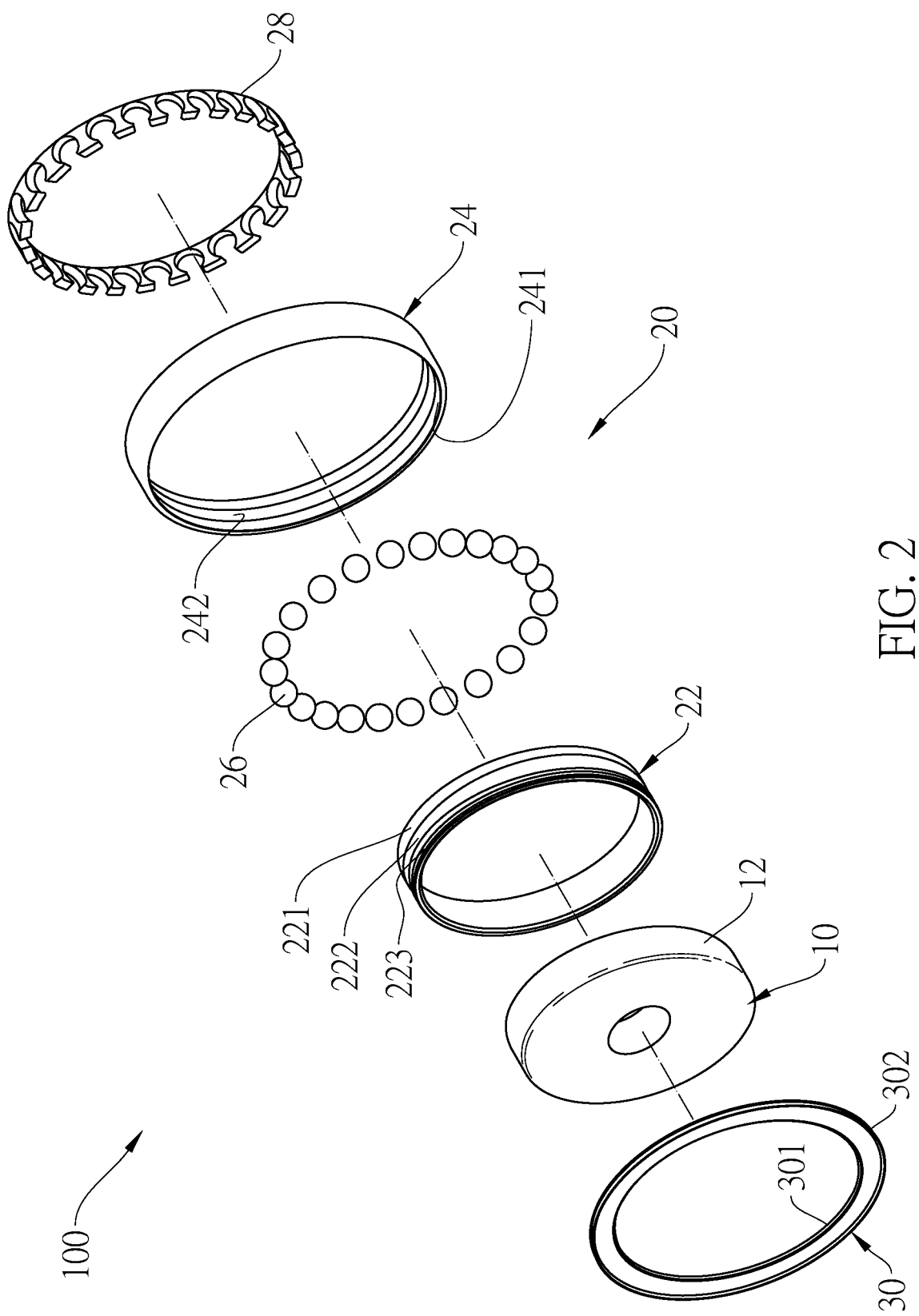
FIG. 2 is an exploded view of the wave generator with the sealing plate according to the embodiment of the present invention.
Figure 3:
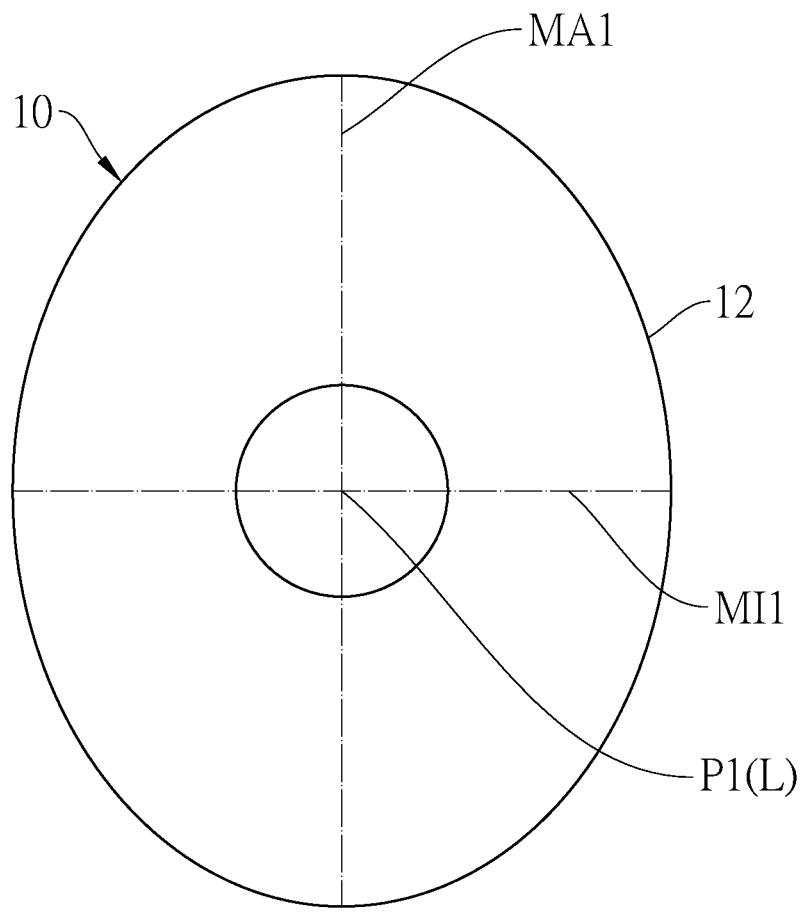
FIG. 3 is a schematic view of the elliptical hub according to the embodiment of the present invention.
Figure 4:
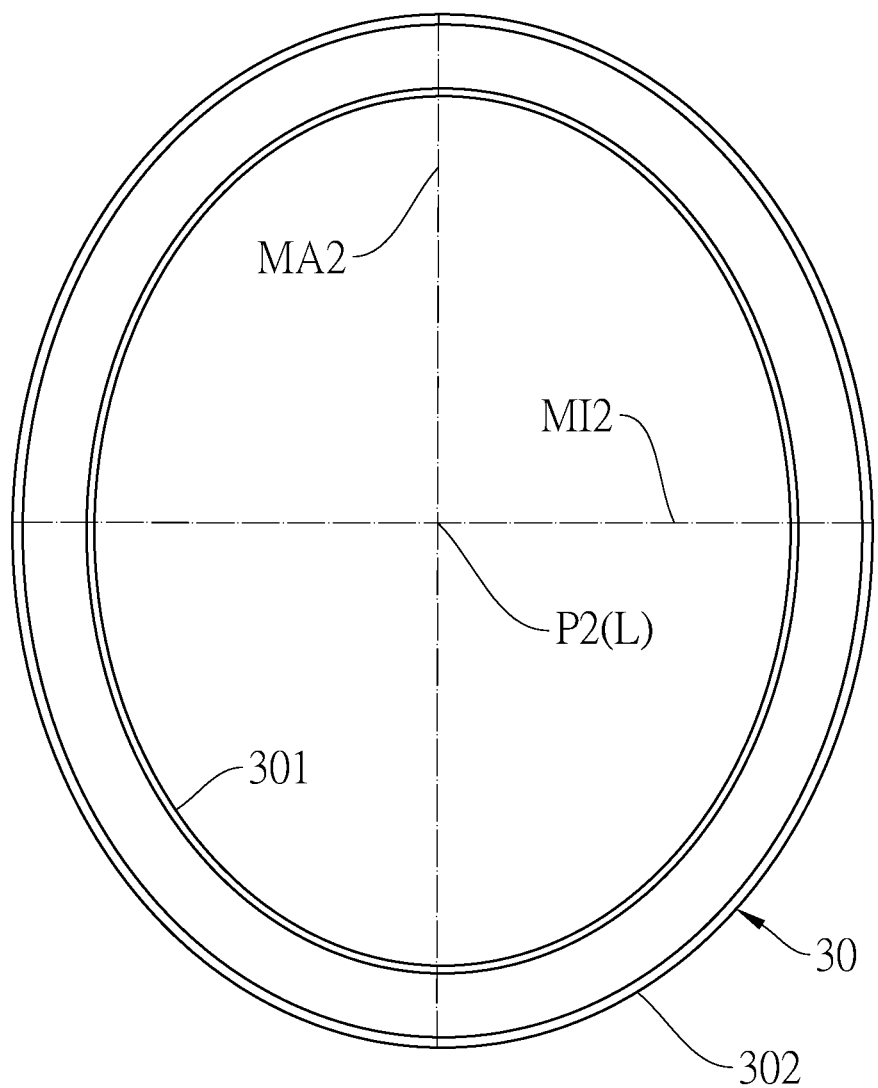
FIG. 4 is a schematic view of the sealing plate according to the embodiment of the present invention.

Referring to FIG. 1 to FIG. 3, the elliptical hub 10, which is the same as an elliptical hub of a conventional wave generator, has a rotating axis L, a first major axis MA1, and a first minor axis MI1, wherein a length of the first major axis MA1 is unequal to a length of the first minor axis MI1. The first major axis MA1 and the first minor axis MI1 intersect and a first intersection P1 is provided at the intersection of the first major axis MA1 and the first minor axis MI1, wherein the first intersection P1 is located at a center of the elliptical hub 10. The rotating axis L passes through the first intersection P1. The elliptical hub 10 has a peripheral surface 12 which is elliptical. To clearly show that a contour of the peripheral surface 12 in the drawings is non-circular, the elliptical hub 10 is illustrated in the drawings of the current embodiment with a clearer difference between the length of the first major axis MA1 and the length of the first minor axis MI1.

Referring to FIG. 2 and FIG. 5 to FIG. 7, the bearing 20 is a flexible bearing and includes an inner ring 22, an outer ring 24, and a plurality of rolling bodies 26, wherein the inner ring 22 fits around the peripheral surface 12 of the elliptical hub 10, so that a shape of the inner ring 22 deforms from a circular shape to an elliptical shape along with the peripheral surface 12. The outer ring 24 is coupled with a periphery of the inner ring 22 through the rolling bodies 26. In the current embodiment, the rolling bodies 26 are balls respectively. The inner ring 22 has an outer peripheral surface 221, wherein an inner ball track 222 is formed on a middle of the outer peripheral surface 221. The outer ring 24 has an inner peripheral surface 241, wherein an outer ball track 242 is formed on a middle of the inner peripheral surface 241. The rolling bodies 26 are disposed between the inner ball track 222 and the outer ball track 24 in a rolling or slidable manner. A holder 28 is disposed between the rolling bodies 26. Through the rolling bodies 26 abutting between the inner ring 22 and the outer ring 24, a shape of the outer ring 24 changes from a circular shape to an elliptical shape along with the shape of the inner ring 22. Because the inner ring 22 fits around the elliptical hub 10 to be fixed and the rolling bodies 26 are disposed between the inner ring 22 and the outer ring 24, the inner ring 22 and the elliptical hub 10 are rotatable around the rotating axis L relative to the outer ring 24.

Referring to FIG. 1 and FIG. 4 to FIG. 7, the sealing plate 30 has a second major axis MA2 and a second minor axis MI2, wherein a length of the second major axis MA2 is unequal to a length of the second minor axis MI2. The second major axis MA2 and the second minor axis MI2 intersect and a second intersection P2 is provided at the intersection between the second major axis MA2 and the second minor axis MI2. A direction of the second major axis MA2 and a direction of the second minor axis MI2 of the sealing plate 30 are respectively the same as a direction of the first major axis MA1 and a direction of the first minor axis MI1 of the elliptical hub 10. The rotating axis L passes through the second intersection P2. An inside and an outside of the sealing plate 30 respectively have an inner edge 301 and an outer edge 302, wherein the inner edge 301 of the sealing plate 30 fits around the inner ring 22 of the bearing 20 to be fixed, and the outer edge 302 of the sealing plate 30 abuts against the inner peripheral surface 241 of the outer ring 24. In this way, the sealing plate 30 could be driven by the elliptical hub 10 and the inner ring 22 to rotate around the rotating axis L and shelters a side of the rolling bodies 26.

When the embodiment of the present invention is used, the wave generator with the sealing plate 100 is installed in the conventional harmonic drive. One of two opposite sides of the bearing 20 along the rotating axis L faces an inside of the harmonic drive, and the other side of the bearing 20 is exposed on an outside of the harmonic drive. As the sealing plate 30 is elliptical and fits around the inner ring 22 to be fixed after the inner ring 22 deforms along with the peripheral surface 12 of the elliptical hub 10, the sealing plate 30 could rotate along with the elliptical hub 10 and the inner ring 22; the outer edge 302 keeps abutting against the inner peripheral surface 241 of the outer ring 24 in the rotating process, so that the sealing function of the sealing plate 30 would not be affected by the continuous deformation of the outer ring 24 because of the rotation of the elliptical hub 10. As the side of the bearing 20 exposed on the outside of the harmonic drive is sheltered by the sealing plate 30, the outside contamination could be prevented from entering the bearing 20 through the inner ring 22 and the outer ring 24, so that the rolling bodies 26 could roll or slide without being affected by the outside contamination, thereby ensuring the stability of the operation and the useful life of the present invention while the present invention is used to drive the harmonic drive. Meanwhile, when the wave generator with the sealing plate 100 is installed in the harmonic drive and the inner ring 22 and the elliptical hub 10 rotate together, a centrifugal force produced by the sealing plate 30 which rotates along with the inner ring 22 could further prevent the outside contamination from entering the bearing 20.

Figure 6:
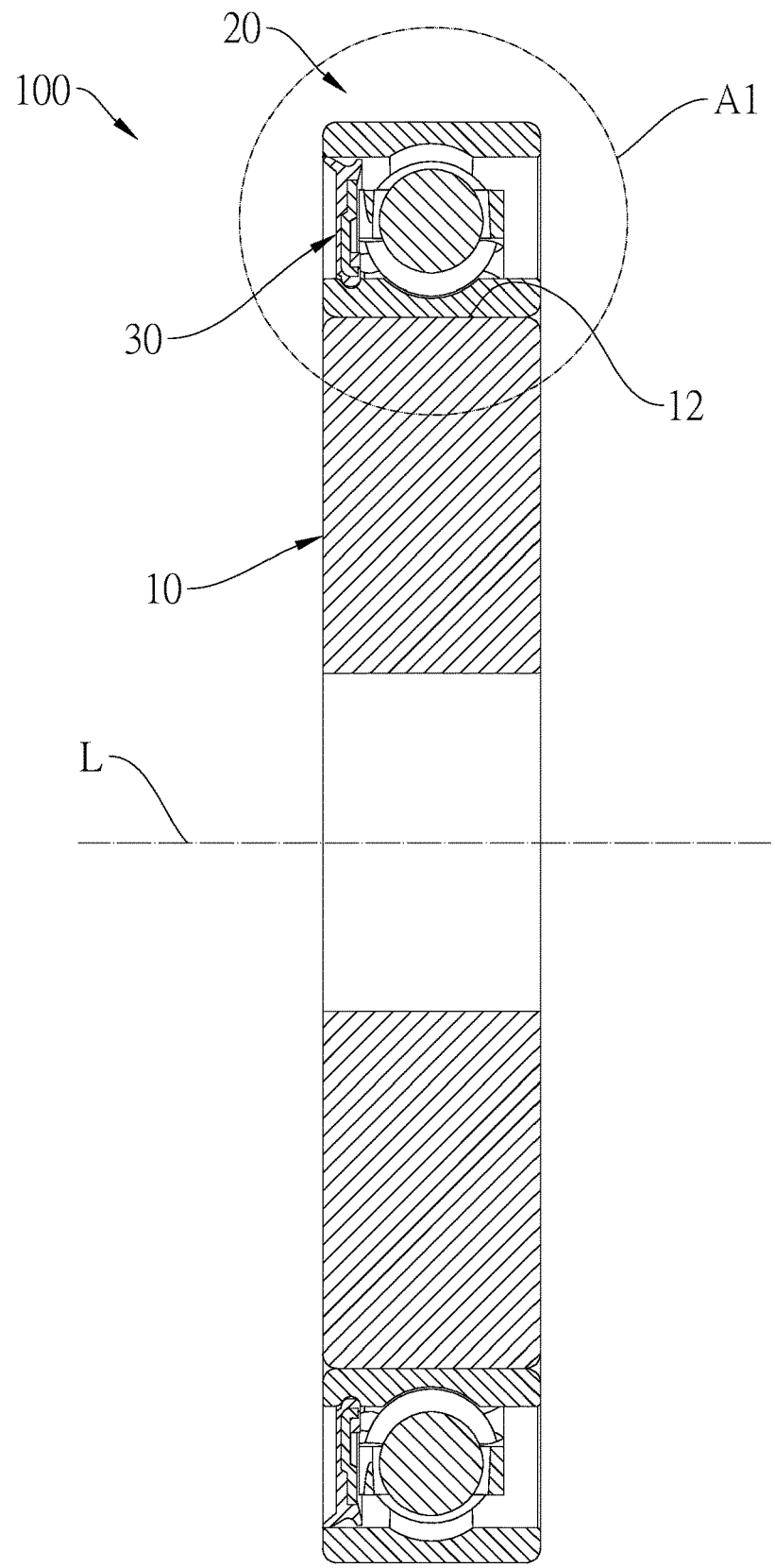
FIG. 6 is a sectional view along the 6-6 line in FIG. 5.
Figure 7:
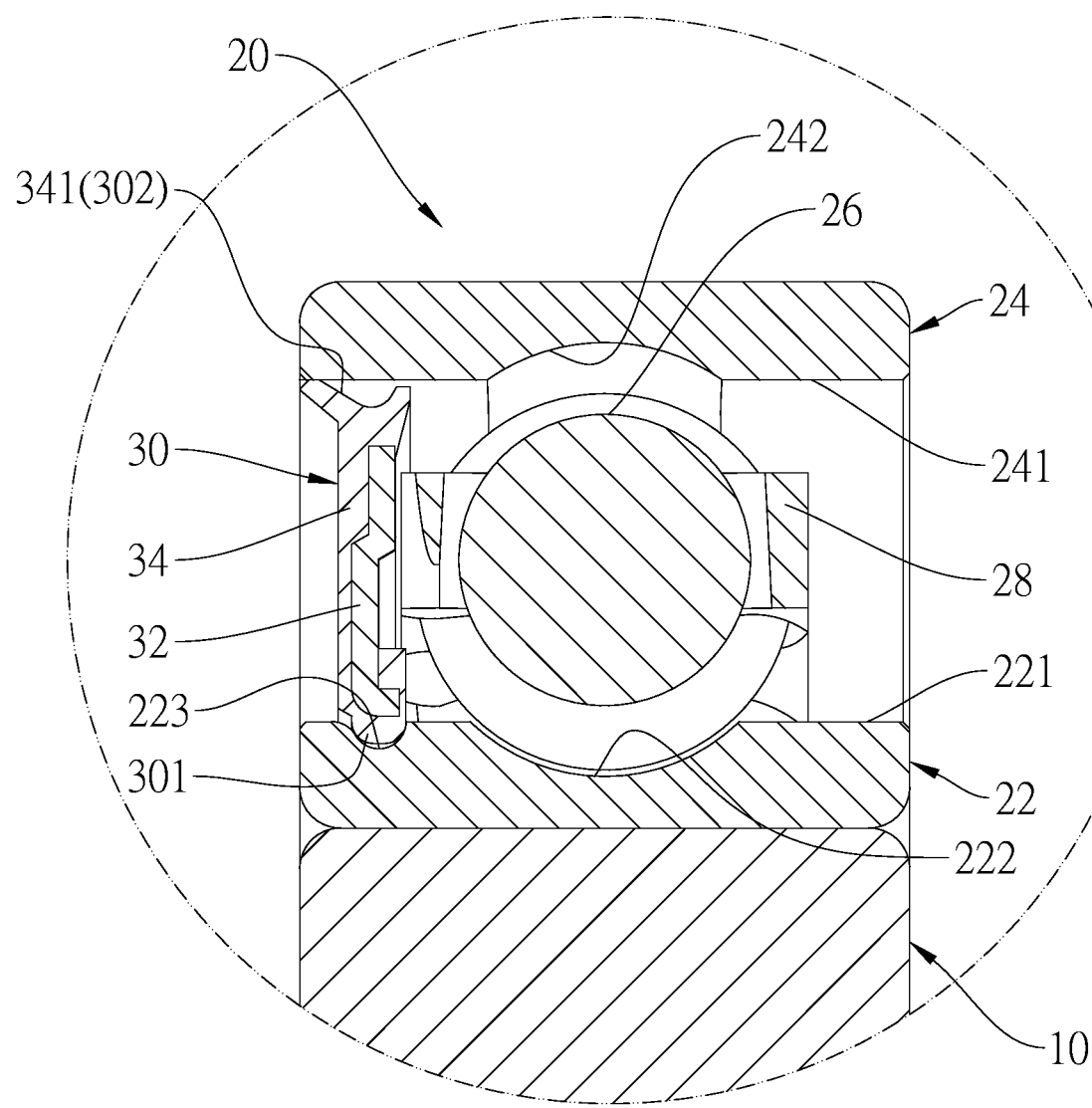
FIG. 7 is an enlarged view of a marked region A1 in FIG. 6.
Figure 8:
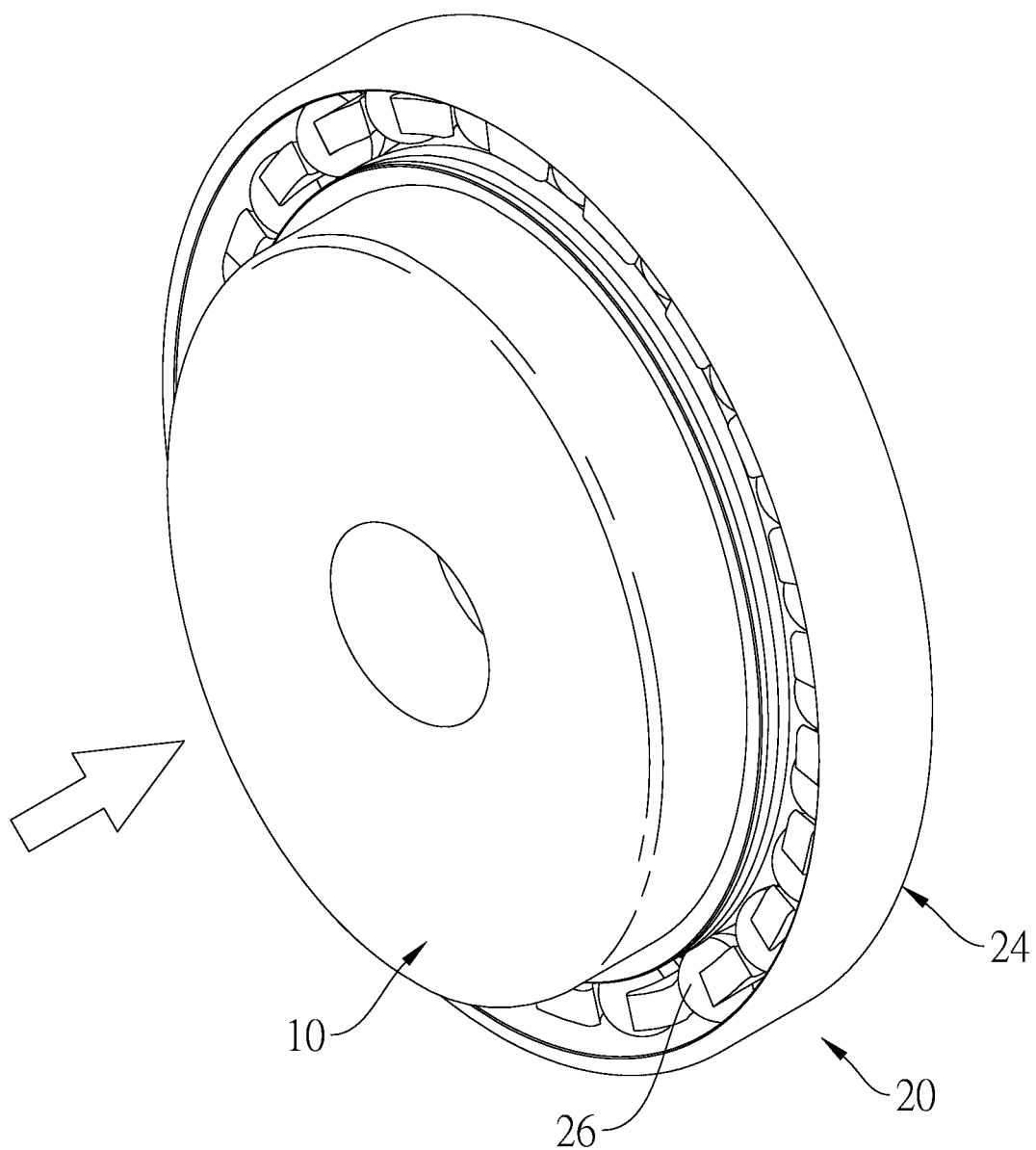
FIG. 8 is a schematic view, showing the elliptical hub being fitted in the bearing according to the embodiment of the present invention.
Figure 9:
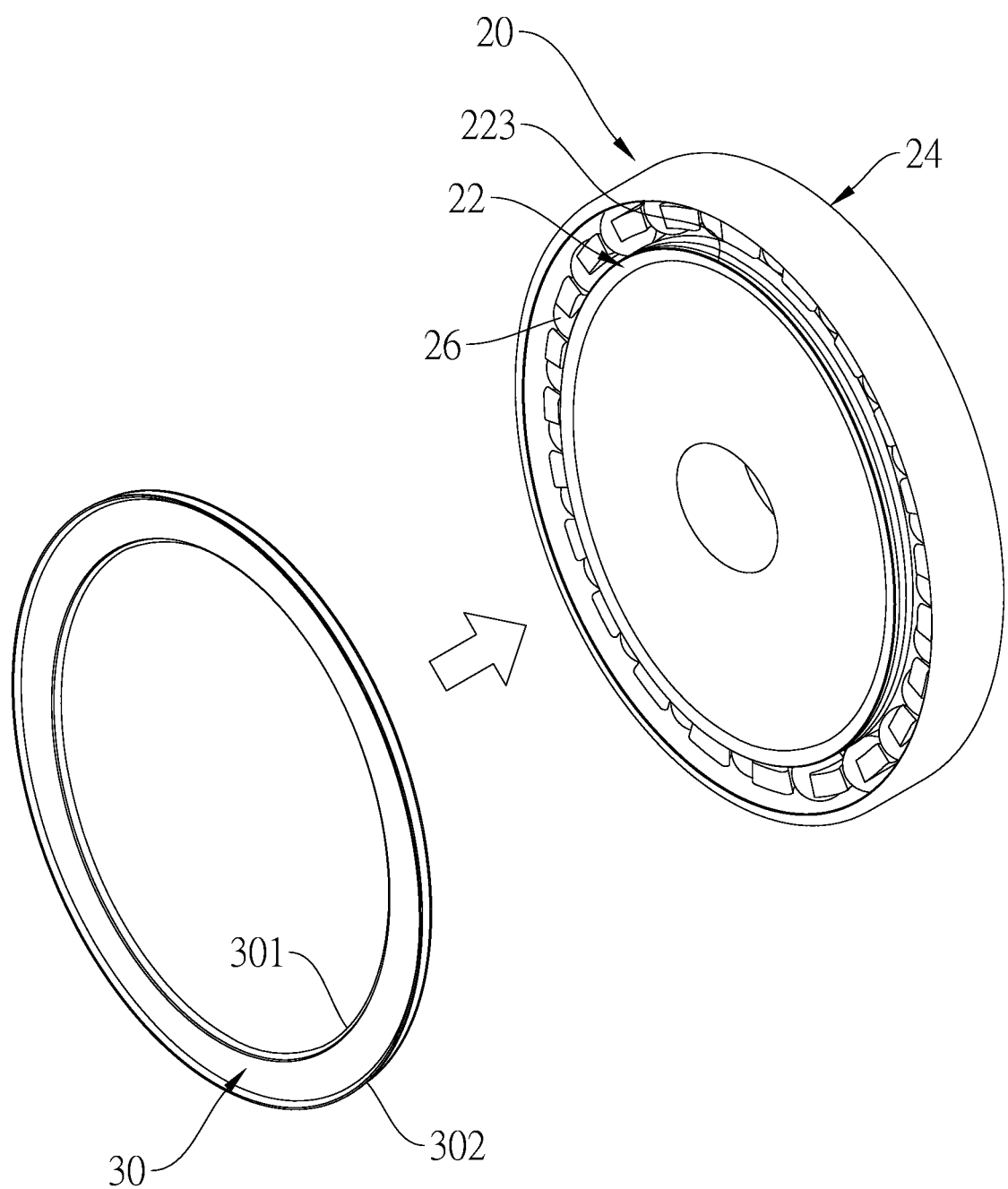
FIG. 9 is a schematic view, showing the sealing plate being fitted in the bearing which is elliptical according to the embodiment of the present invention.

Referring to FIG. 2 and FIG. 6 to FIG. 7, in the current embodiment, a sealing plate groove 223 is formed on the outer peripheral surface 221 of the inner ring 22. The inner edge 301 of the sealing plate 30 fits in the sealing plate groove 223 to be fixed. More specifically, the sealing plate 30 includes a core ring 32 and a flexible enclosing body 34 enclosing around the core ring 32, wherein the core ring 32 is an elliptical and annular sheet body. The flexible enclosing body 34 is made of polymer elastomer, such as rubber and plastic, and is formed around the core ring 32 by overmolding. The inner edge 301 and the outer edge 302 are respectively disposed on an inside and an outside of the flexible enclosing body 34. The flexible enclosing body 34 has a prong portion 341 on the outer edge 302, wherein the prong portion 341 abuts against the inner peripheral surface 241 of the outer ring 24.

Figure 5:
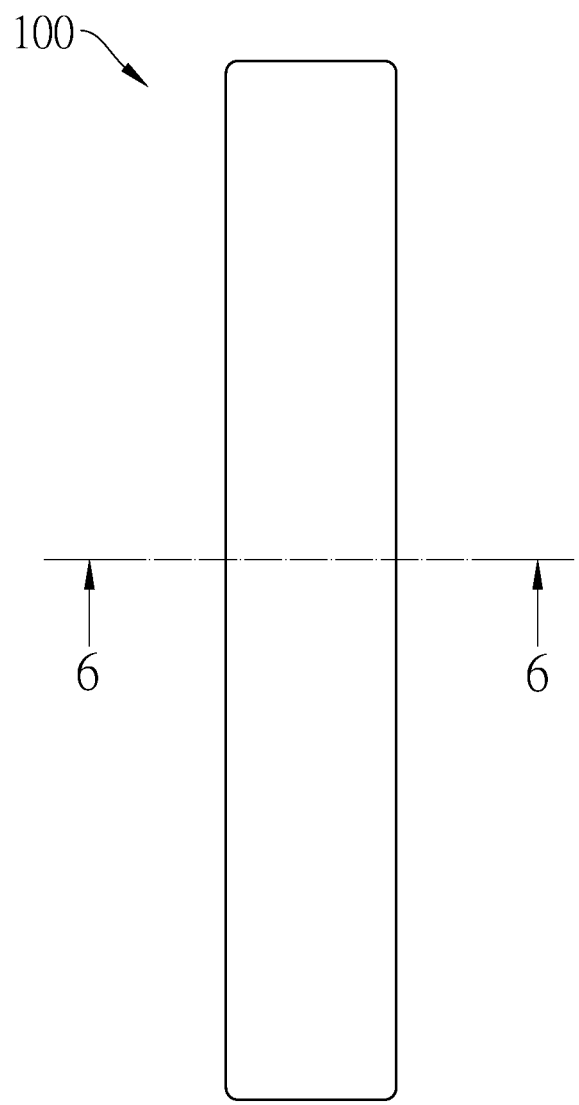
FIG. 5 is a top view of the wave generator with the sealing plate according to the embodiment of the present invention.

A conventional bearing already has a sealing plate after being assembled, which fixes an interval between an inner ring and an outer ring, so that the conventional bearing could not fit around the elliptical hub 10. In comparison, an installation method of the wave generator with the sealing plate 100 according to the embodiment of the present invention is provided and is different from an installation method of the conventional bearing, wherein the sealing plate 30 could be disposed in the bearing 20 which is deformed and could shelter the side of the bearing 20 exposed and located between the inner ring 22 and the outer ring 24 without being affected by the deformation of the outer ring 24 during the operation of the wave generator with the sealing plate 100. The installation method of the wave generator with the sealing plate 100 includes steps in sequence:

The inner ring 22, the outer ring 24, and the rolling bodies 26 constitute the bearing 20; at that time, the inner ring 22 and the outer ring 24 of the bearing 20 are circular in shape and the rolling bodies 26 abut between the inner ring 22 and the outer ring 24;

The elliptical hub 10 which is elliptical is fitted in the inner ring 22 of the bearing 20, so that the inner ring 22 of the bearing 20 fits around the peripheral surface 12 of the elliptical hub 10; while the elliptical hub 10 is fitted in the inner ring 22, the shape of the inner ring 22 and the shape of the outer ring 24 change from a circular shape to an elliptical shape along with a shape of the peripheral surface 12; at that time, the inner ring 22 and the elliptical hub 10 are rotatable around the rotating axis L relative to the outer ring 24;

The sealing plate 30 is installed between the inner ring 22 and the outer ring 24 of the bearing 20, so that the inner edge 301 of the sealing plate 30 fits around the inner ring 22 of the bearing 20 and the outer edge 302 of the sealing plate 30 abuts against the outer ring 24; as shown in FIG. 1, FIG. 5, and FIG. 6, because the sealing plate 30 fits around the inner ring 22 and a periphery of the elliptical hub 10 which are non-circular, the sealing plate 30 could be driven by the elliptical hub 10 and the inner ring 22 to rotate around rotating axis L; the sealing plate 30 keeps abutting against the outer ring 24 through the outer edge 302 during the rotation of the sealing plate 30 and shelters the side of the rolling bodies 26. In this way, the outside contamination could be prevented from entering the bearing 20 through the side of rolling bodies 26, which ensures that the elliptical hub 10 and the inner ring 22 could smoothly rotate through the rolling bodies 26 abutting against the outer ring 24.

It must be pointed out that the embodiments described above are only some preferred embodiments of the present invention. All equivalent structures which employ the concepts disclosed in this specification and the appended claims should fall within the scope of the present invention.

What is claimed is:

1. A wave generator with a sealing plate, comprising:
an elliptical hub having a rotating axis, a first major axis, and a first minor axis, wherein a length of the first major axis is unequal to a length of the first minor axis; the rotating axis passes through a center of the elliptical hub;
a bearing which is a flexible bearing and comprises an inner ring, an outer ring, and a plurality of rolling bodies, wherein the inner ring fits around a peripheral surface of the elliptical hub, so that a shape of the inner ring changes from a circular shape to an elliptical shape along with the peripheral surface of the elliptical hub; the outer ring is coupled with a periphery of the inner ring through the plurality of rolling bodies; the inner ring and the elliptical hub are rotatable around the rotating axis relative to the outer ring; and
a sealing plate which is non-circular elliptical and has a second major axis and a second minor axis, wherein a length of the second major axis is unequal to a length of the second minor axis while the sealing plate is undeformed; a direction of the second major axis and a direction of the second minor axis of the sealing plate are respectively the same as a direction of the first major axis and a direction of the first minor axis of the elliptical hub; the sealing plate fits around the inner ring of the bearing, which has been deformed into an elliptical shape, by an inner edge of the sealing plate and abuts against the outer ring by an outer edge of the sealing plate; the sealing plate is driven by the elliptical hub and the inner ring to rotate around the rotating axis and shelters a side of the plurality of rolling bodies; a centrifugal force produced by the sealing plate which rotates along with the elliptical hub prevents the outside contamination from entering the bearing.

2. The wave generator with the sealing plate as claimed in claim 1, wherein the inner ring has an outer peripheral surface; a sealing plate groove is formed on the outer peripheral surface of the inner ring; the inner edge of the sealing plate fits in the sealing plate groove.

3. The wave generator with the sealing plate as claimed in claim 1, wherein the sealing plate comprises a core ring and a flexible enclosing body enclosing around the core ring; the inner edge and the outer edge are respectively disposed on an inside and an outside of the flexible enclosing body.

4. The wave generator with the sealing plate as claimed in claim 2, wherein the sealing plate comprises a core ring and a flexible enclosing body enclosing around the core ring; the inner edge and the outer edge are respectively disposed on an inside and an outside of the flexible enclosing body.

5. The wave generator with the sealing plate as claimed in claim 3, wherein the core ring is an elliptical and annular sheet body; the flexible enclosing body has a prong portion on the outer edge, wherein the prong portion abuts against an inner peripheral surface of the outer ring.

6. The wave generator with the sealing plate as claimed in claim 4, wherein the core ring is an elliptical and annular sheet body; the flexible enclosing body has a prong portion on the outer edge, wherein the prong portion abuts against an inner peripheral surface of the outer ring.

7. An installation method of a wave generator with a sealing plate, comprising in sequence:
preparing a bearing which is a flexible bearing and comprises an inner ring, an outer ring, and a plurality of rolling bodies, wherein the plurality of rolling bodies slidably abut between the inner ring and the outer ring;
fitting an elliptical hub in the inner ring of the bearing, so that the inner ring fits around a peripheral surface of the elliptical hub; the inner ring and the outer ring change from a circular shape to an elliptical shape along with a shape of the peripheral surface of the elliptical hub; the inner ring and the elliptical hub are rotatable around a rotating axis of the elliptical hub relative to the outer ring; and
installing a sealing plate, which is non-circular elliptical and has a second major axis and a second minor axis where a length of the second major axis is unequal to a length of the second minor axis while the non-circular elliptical sealing plate is undeformed, between the inner ring and the outer ring of the bearing, so that an inner edge of the sealing plate fits around the inner ring of the bearing, which has been deformed into an elliptical shape, and an outer edge of the sealing plate abuts against the outer ring; the sealing plate is driven by the elliptical hub and the inner ring to rotate around the rotating axis and shelters a side of the plurality of rolling bodies.

* * * * *